Figure 1:
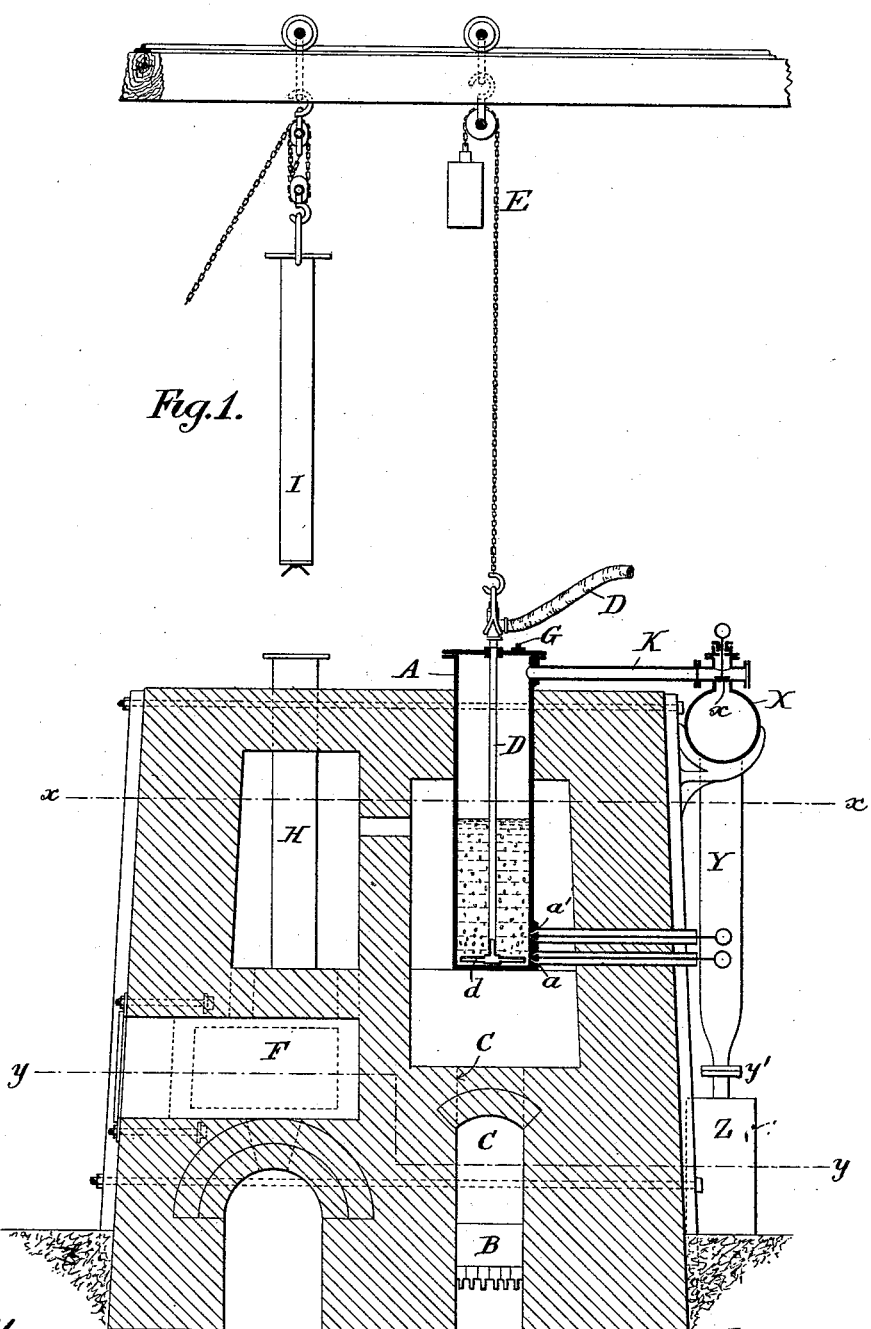

(No Model.) 3 Sheets—Sheet 1.

G. T. BEILBY.
PROCESS OF MAKING CYANIDES.

No. 484,579. Patented Oct. 18, 1892.

(No Model.) 3 Sheets—Sheet 2.

G. T. BEILBY.
PROCESS OF MAKING CYANIDES.

No. 484,579. Patented Oct. 18, 1892.

(No Model.) 3 Sheets—Sheet 3.
G. T. BEILBY.
PROCESS OF MAKING CYANIDES.

No. 484,579. Patented Oct. 18, 1892.

UNITED STATES PATENT OFFICE.

GEORGE THOMAS BEILBY, OF SLATEFORD, SCOTLAND.

PROCESS OF MAKING CYANIDES.

SPECIFICATION forming part of Letters Patent No. 484,579, dated October 18, 1892.

Application filed February 13, 1892. Serial No. 421,438. (No specimens.) Patented in England March 18, 1891, No. 4,820.

*To all whom it may concern:*

Be it known that I, GEORGE THOMAS BEILBY, chemical engineer, a subject of the Queen of Great Britain, residing at St. Hitts, Slateford, in the county of Mid-Lothian, North Britain, have invented a new and useful Process for the Manufacture of Cyanides, (for which I have obtained a patent in Great Britain, No. 4,820, bearing date March 18, 1891,) of which the following is a specification.

My invention has for its object the direct production of simple cyanides of high or of moderately-high percentage in a convenient and marketable form; and it consists in a process whereby such cyanides are produced by passing ammonia over or through a liquid-fused mixture of anhydrous alkali and alkaline cyanide with finely-divided carbon. I pass ammonia over or through a mixture of anhydrous alkali with alkaline cyanide and finely-divided carbon at a temperature sufficiently high to keep the mixture fluid and to decompose the ammonia. By this means carbon and ammonia are consumed and a large part of the alkali is converted into cyanide. The fused cyanide which is obtained contains a small percentage of finely-divided carbon, which may be removed by settling or filtration.

As it is desirable that the operation should be conducted at as low a temperature as possible, so as to avoid waste of materials or damage to the apparatus, the proportions of the several ingredients are so adjusted that the mixture is fluid at a temperature below that at which iron would be rapidly destroyed. In practice I have found that a mixture containing about twenty per cent. of cyanide of potassium, twenty to twenty-five per cent. of carbon, and fifty-five to sixty per cent. of carbonate of potassium melts at a sufficiently-low temperature; but I do not restrict myself to any exact proportions, as these must vary more or less according to the materials and to the form of apparatus used. The process may be carried out in a melting-pot provided with an inlet-pipe for ammonia, an outlet-pipe for the gases evolved in the process, an opening or hopper for the introduction of the solid materials, and a tap-hole for running off the finished cyanide. When the mixture in the pot has been brought into a state of fusion, ammonia is brought into intimate contact with it either by bubbling the ammonia through the fluid or by breaking up the fluid by mechanical means, while the ammonia-gas is passed through the pot. Throughout the operation it is important to have a sufficient proportion of cyanide in the mixture to render it thoroughly fluid; otherwise the mass froths up and is apt to choke the exit-pipe or otherwise to interfere with the proper carrying out of the process. As the mixture becomes more fluid by the formation of further quantities of cyanide, fresh quantities of alkali and carbon may be added from time to time till the pot is filled to its fullest working capacity, or the full charge may be introduced into the pot before the ammonia is turned on. The supply of ammonia is then kept up till the desired proportion of cyanide is obtained, after which the fused salt may be settled or filtered, or is directly run into molds or drums and is ready for the market. The gases from the process containing undecomposed ammonia may be led through other melting-pots, or may be led directly from the first pot to washers or absorbers for the recovery of the ammonia, or the gases from the pot or pots may be led through tubes containing an infusible mixture of carbon and alkali kept at a suitable temperature for the production of cyanide.

In carrying out my invention, even when the operation in the melting-pot is conducted at a temperature somewhat below the melting-point of carbonate of sodium, and therefore much below the boiling-point of the cyanide of potassium or of sodium, the gases as they leave the melting-pot carry with them a considerable quantity of alkaline cyanide. At higher temperatures correspondingly-larger quantities of cyanide are carried over by the gases. I therefore employ a suitable chamber or chambers, through which the gases are caused to pass on their way to the scrubbers or other apparatus above referred to for the recovery of the ammonia. In these chambers the fumes of cyanide condense and deposit, and the condensed product is removed therefrom from time to time. If the gases contain any watery vapor, the chambers are maintained at a sufficiently-high temperature (either by a steam-jacket or other suitable means) to prevent its condensation, so that the cyanide may be recovered in a dry condition. The cyanide obtained may be used in the form in which it is deposited; but, if desirable, it may be remelted and run into molds or drums, or it may be returned to the melting-pot and drawn off with the rest of the cyanide. It is obvious that the greater or less volatilization of the cyanide from the melting-pot is a question of time, temperature, and volume of gas passing through, and if it were desirable the process might be worked so that the greater part of the cyanide might be sublimed over and drawn off from the chamber as sublimate, instead of from the melting-pot as fused salt.

The apparatus for carrying my invention into effect may vary, a suitable form of apparatus for the purpose being illustrated in the accompanying drawings, in which—

Figure 2:
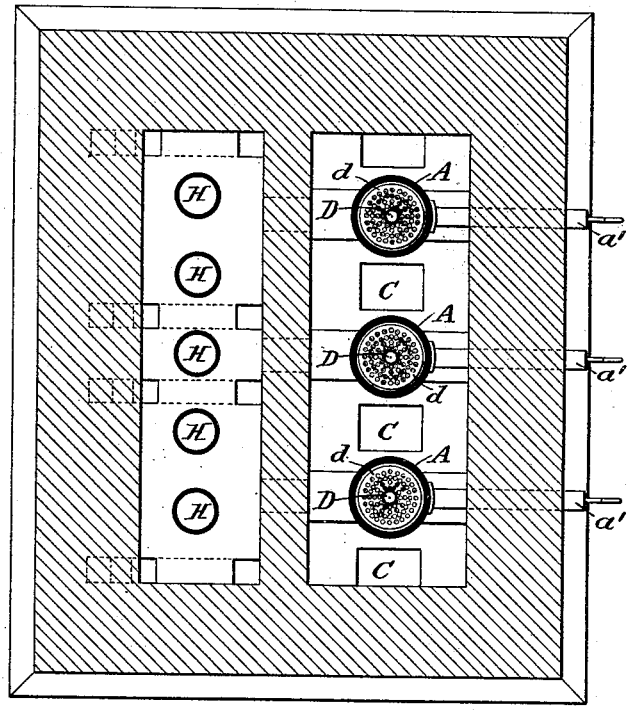
Figure 3:
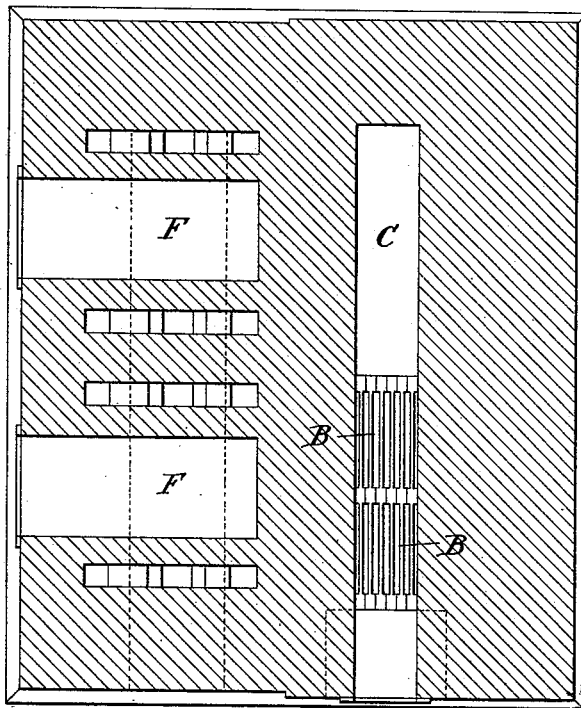
Figure 4:
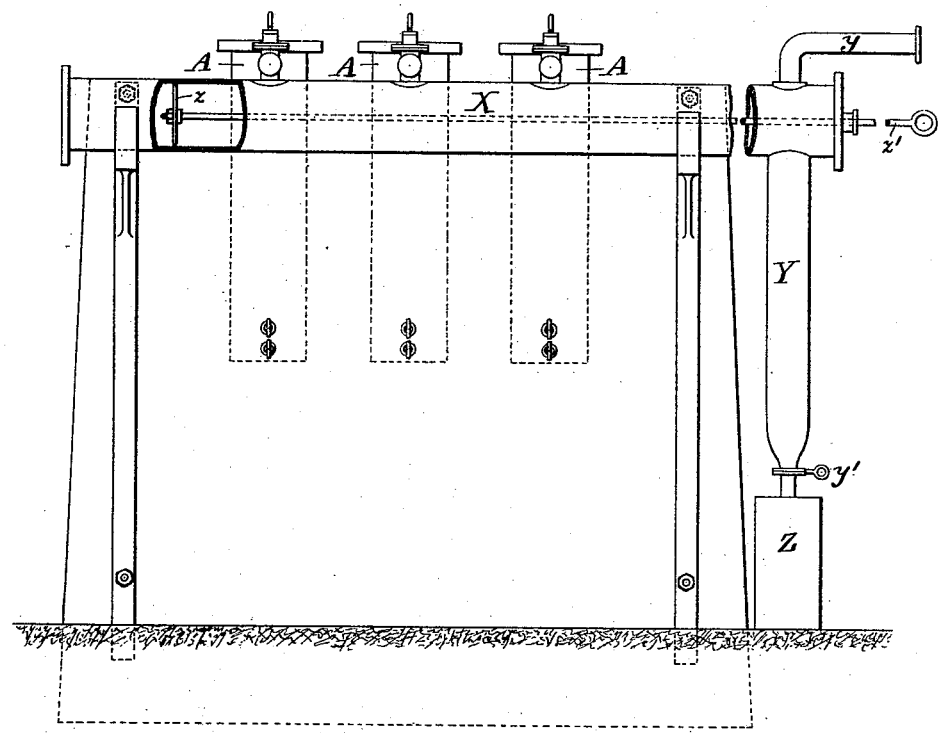

Figure 1 is a vertical section of one form of apparatus suitable for the purpose of bringing the ammonia into intimate contact with the fused mixture by bubbling. Fig. 2 is a horizontal section of Fig. 1 on line $x\ x$. Fig. 3 is a horizontal section of Fig. 1 on line $y\ y$. Fig. 4 is a front elevation at right angles to Fig. 1, showing particularly the chamber used for recovering cyanides from the gases leaving the melting-pot.

Similar letters of reference indicate corresponding parts in all the figures where they occur.

The melting-pot A, of cast-iron, is built in an oven heated by a furnace B and flues C. It is provided with one or more tap-holes $a$ $a'$, with plugs which can be opened or closed from the outside of the structure. The upper part of the pot is covered by a plate or blind flange, through which the ammonia-tube D passes. The ammonia-tube may be simply open at its lower end or it may terminate in perforated branch pipes or in a perforated rose-distributer $d$, the object aimed at in the introduction of the ammonia being that it shall come into intimate contact with the fluid in the pot. The arrangement which does this most effectively will be the best. Instead of one large ammonia pipe and distributer, a number of smaller pipes may be introduced. Owing to the rapid decomposition of ammonia by high temperatures, it is best to lead the pipe D down the inside from the top of the pot A; but it is evident that a suitably-protected pipe might be led from the outside into the bottom of the pot.

A convenient hoisting apparatus E is arranged above the pot, so that the ammonia-pipe and cover can be lifted out and in.

Spare covers without ammonia-pipes are provided for closing the pot A when the ammonia-pipe is not in place.

F is an oven or drying-chamber, in which the raw materials may be dried and warmed.

The covers are provided with suitable openings through which the fluid inside can be gaged or sampled. These openings can be closed air-tight by plugs or covers G.

The pot or crucible H is provided for the final heating of the alkali or alkali and carbon before they are put in the pot. The alkali or the mixture of alkali and carbon to be heated is contained in an inner case I, which can be filled on the ground or at any convenient point, and is then hoisted up and slipped into the crucible H, from which after heating it is again removed and its hot contents turned over into the melting-pot A.

The heating pot or crucible may be arranged in any other convenient way so as to carry out the object aimed at.

In carrying out the process in apparatus of this form the charge of dry hot alkali and carbon, along with a proportion of cyanide, is brought into a state of tranquil fusion in the melting-pot A at a suitable temperature. The cover of the pot A is then quickly removed and the ammonia-tube D lowered into its place and the attached cover firmly secured to the flange of the pot. Before lowering the ammonia-tube into the liquid it is advisable to turn on the ammonia; otherwise the liquid would be apt to plug the tube and close its perforations. The stream of ammonia is bubbled through the liquid mixture in the pot till the desired percentage of cyanide is reached. This is ascertained by sampling the liquid by a dipper introduced through one of the openings G in the cover, care being necessary to avoid oxidation of the cyanide by air. Fresh portions of alkali and carbon may be added from time to time till the pot is filled to its fullest working capacity, or the full charge may be introduced before the ammonia is turned on. When the required percentage of cyanide has been reached, the ammonia-pipe is withdrawn from the pot, which is immediately closed by one of the close covers. The cyanide is then run off into molds or drums by the upper tap-hole $a'$. The portion of cyanide which remains in the pot serves to start the next charge. When the alkali used is carbonate of potassium, I find that the process proceeds satisfactorily at a temperature somewhat below the melting-point of pure carbonate of sodium and that I easily obtain a product containing seventy per cent. of cyanide and upward; but I do not restrict myself to that or any other precise temperature.

In running off the cyanide I find it convenient to leave a proportion of the finished charge in the pot to provide cyanide with which to start the next charge, and this, as above stated, can be effected by drawing off the finished charge through the upper tap-hole $a'$.

The pot A is provided at its upper end with an exit-pipe K, through which the gases from the process are conveyed through suitable scrubbers for the recovery of such excess of ammonia as may have escaped decomposition in the pot and of any volatilized alkaline salts; or these gases, after the removal of any water they may contain, may be led through secondary retorts or tubes containing alkalized charcoal kept at a suitable temperature for the formation of cyanide, the charcoal with cyanide so obtained being used in making the mixture for the pot. By this means the waste of either ammonia or alkali is reduced to a minimum.

The chamber used for the condensation and deposition of cyanides carried over by the gases from the melting-pot A may be in the form of a tube or pipe X of any suitable length, and to which the escape-pipe K from each of the melting-pots is connected, a plug or other valve $x$ being provided for cutting off connection when the melting-pot is open. At one end of pipe or tube X a pipe Y extends downward, so that the cyanide deposited in the tube can be delivered therefrom into a drum or other receptacle Z when desired. A scraper $z$ is preferably provided within tube X, and when actuated by the handle or rod $z'$ (working through a suitable stuffing-box or gland) will carry the deposited cyanide to the end of the tube, at which delivery-pipe Y is situated, and cause same to pass into the latter. The bottom of pipe Y is provided with a slide or other valve $y'$ for closing same, except when it is desired to deliver the cyanide. A pipe $y$ enables the gases to pass from chamber or tube X either to a second chamber for further treatment for the recovery of any cyanide still contained in such gases or to scrubbers for the recovery of ammonia therefrom.

It will be readily understood that the apparatus for recovering the cyanides above described is only given as an example of a suitable form of apparatus for such purpose, and that any other form of apparatus might be employed which would enable the cyanides contained in the gases to be effectually condensed and deposited.

The ammonia is generated in any convenient way; but care should be taken to free it as thoroughly as possible from water-vapor.

I can to a certain extent use the volatile alkaloidal bases from crude shale or coal-oils or from peat-tar, or from animal or bone oil, instead of ammonia.

The alkalies I prefer to use are the anhydrous carbonates of potassium and sodium, separately or in mixture; but other anhydrous alkalies may be used.

The carbon may be supplied in the form of charcoal, lamp-black, gas-black, coke or pitch, or any other convenient form.

By using pitch or coke made from the basic tars or from the crude oils of shale, coal, or peat I am able to recover a large part of the nitrogen they contain as cyanide.

When volatile alkaloidal bases—such as those from crude shale-oils or from peat-tar or from animal or bone oil—are used as a source of nitrogen, it is not necessary to use so much free carbon in the mixture with alkali, as the decomposition of these bases produces free carbonaceous matter.

When it is intended to convert the cyanide into ferro-cyanide, I may add a proportion of finely-divided iron to the mixture of alkali, cyanide, and carbon.

Having fully described my invention, what I claim, and desire to secure by Letters Patent, is—

1. The process for the production of cyanides of the fixed alkalies, consisting in bringing ammonia into intimate contact with a liquid-fused mixture of anhydrous alkali, cyanide, and carbon, as described.

2. The process for the production of cyanides of the fixed alkalies, consisting in bringing the vapors of alkaloidal bases into intimate contact with a liquid-fused mixture of anhydrous alkali, cyanide, and carbon, as described.

GEORGE THOMAS BEILBY.

Witnesses:
CHAS. A. ALLISON,
HARRY A. MCLELLAN.